July 8, 1958 E. S. PURINGTON 2,842,614

REMOTELY CONTROLLED RECEIVER FOR RECORDING SELECTED PORTIONS OF TELECAST

Filed April 1, 1952 3 Sheets-Sheet 1

Inventor

ELLISON S. PURINGTON.

By

Attorney

Inventor
ELLISON S. PURINGTON.
By [signature]
Attorney

Inventor
ELLISON S. PURINGTON.
By
Attorney

United States Patent Office 2,842,614
Patented July 8, 1958

2,842,614

REMOTELY CONTROLLED RECEIVER FOR RECORDING SELECTED PORTIONS OF TELECAST

Ellison S. Purington, Gloucester, Mass., assignor to John Hays Hammond, Jr., Gloucester, Mass.

Application April 1, 1952, Serial No. 279,734

3 Claims. (Cl. 178—7.4)

This invention relates to an improved method of receiving a still picture transmitted over a television channel and causing it to be displayed after the normal television program has been restored.

In a previous patent of John Hays Hammond Jr., No. 2,611,027, granted September 16, 1952 a system has been shown of this general type. Further in a more recent application Serial No. 152,174, filed March 27, 1950 I have shown improved transmitter and receiver circuits for such purposes. And in a copending application Serial No. 279,733, filed April 1, 1952, now Patent No. 2,764,630, issued March 15, 1949, I have shown further improved transmitter circuits. The present application covers receiver electrical and mechanical systems and devices more especially adapted to receive the transmitted signals of my prior above mentioned applications.

The invention provides for using an improved method of recording, processing and projecting, described by Clifton M. Tuttle and Fordyce M. Brown, "High Speed Processing of 35 mm. Pictures," JSMPTE vol. 54, p. 149 (Feb. 1950).

The invention also consists in certain new and original features of construction and combinations of parts hereinafter set forth and claimed.

The nature of the invention, as to its objects and advantages, the mode of its operation and the manner of its organization, may be better understood by referring to the following description, taken in connection with the accompanying drawings forming a part thereof, in which Fig. 1 is a schematic diagram showing electronic and relay circuits for causing the camera shutter to operate at the proper time for recording the still picture and for initiating the operation of further circuits;

Like reference characters denote like parts in the several figures of the drawing.

In the following description parts will be identified by specific names for convenience, but they are intended to be generic in their application to similar parts.

Figure 1:
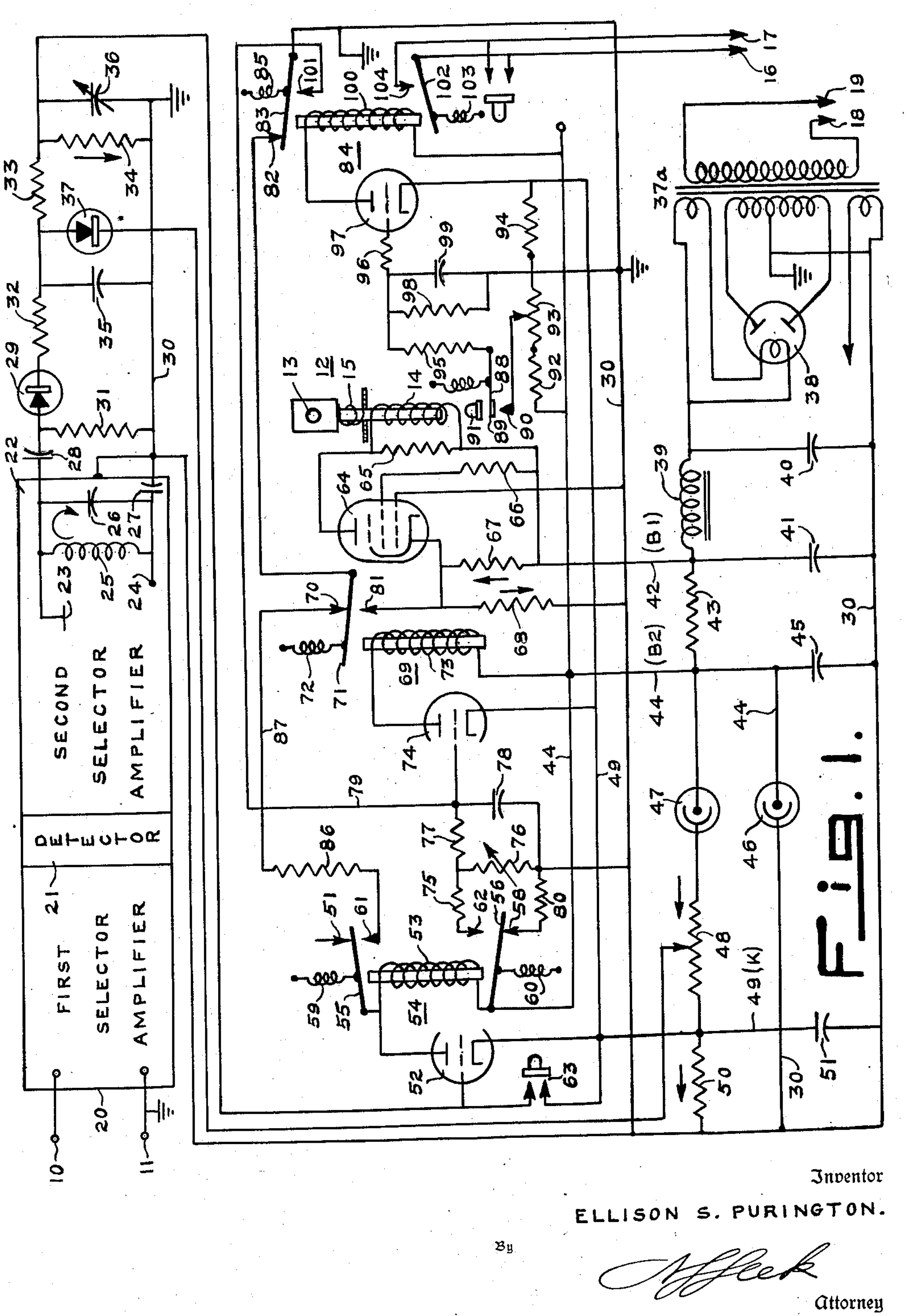

In Fig. 1, the signal input terminals of the system are 10, 11, the latter being grounded. These terminals are assumed to be connected to the video circuit of a television receiver. For example, if the receiver utilizes a projecting kinescope with cathode drive and grid at fixed voltage, then terminal 10 might be connected, through a blocking capacitor if necessary, to the cathode of the projection kinescope, and terminal 11 might be connected to the receiver chassis. Device 12 represents the moving member of a straight line shutter which permits light to pass through an aperture 13 when the shutter member is pulled down by solenoid 14. That is, the shutter and light recording surface are so arranged that the picture on the kinescope screen is recorded when the solenoid is in the pulled down position. When the solenoid 14 is de-energized, the shutter member is restored to its normal indicated position by restoring spring 15. Terminals 16, 17 are the output terminals of Fig. 1, and are connected to similarly numbered input terminals of Fig. 2. Terminals 18, 19 are connected to an A. C. power line, such as 110 volts 60 cycle, for powerizing the circuit of Fig. 1.

The circuit of Fig. 1 is responsive to a special type of signal in the video receiver impressed upon the terminals. For example it may comprise a signal of a higher frequency such as 456 k. c. s. amplitude modulated at a lower frequency, such as 1200 cycles. For such a signal, a first selector 20 is provided to select out energy in the vicinity of the higher frequency and amplify it if desired. The selected energy is then subjected to detection by device 21 to determine the nature of its amplitude modulation. The detected output is then impressed upon a second selector responsive to energy of the lower desired frequency and amplified by device 22. In this device, 23 represents the anode of a last electronic tube, and 24 the high voltage supply terminal. Between these is connected an inductor 25 paralleled by a capacitor 26, these being tuned to the desired low frequency such as 1200 cycles. It is clear that voltage will be built up across the capacitor 26 only when there is considerable amount of video energy content in the vicinity of the higher desired frequency, and when this is amplitude modulated efficiently at the lower frequency to which the circuit 25, 26 is tuned. Within the device 22, the terminal 24 is connected through a capacitor 27 to the case which is connected to ground.

The anode 23 is connected through capacitor 28 to the anode of a rectifier 29 which is connected to ground line 30 through a resistor 31. The cathode of rectifier 29 is connected through resistors 32, 33, 34 to ground line 30. Across resistors 33 and 34 in series, to ground line 34, is a capacitor 35 for partially smoothing the rectified output; across resistor 34 alone to ground line 30 is a capacitor 36, which may be variable. The junction of resistors 32 and 33 are connected to the anode of a unidirectional conductor 37 such as a rectifier, the cathode of which is maintained at a substantially fixed positive potential with respect to ground in a manner to be described later. This is to limit the D. C. voltage impressed upon the resistors 33 and 34 so that the time required to charge capacitor 36 to a given voltage is substantially independent of the amount of signal above a required threshold value, derived from the selector 22 and impressed upon rectifier 29. It is seen therefore that means is provided for establishing a positive D. C. voltage across the capacitor 36 in response to the desired control signal, for controlling the subsequent circuits.

For powerizing the remainder of the circuit of Fig. 1, a special power rectifier circuit is provided. This includes a transformer **37*a*, rectifier 38, choke 39, filter capacitors 40 and 41, all in conventional arrangement. This arrangement delivers a higher anode supply voltage $B_1$ to line 42. This line is connected through dropping resistor 43 to a lower anode supply line 44 with voltage $B_2$, provided with a bypass capacitor 45 to ground. The voltage of line 44 is stabilized by a voltage regulator tube 46 connected between line 44 and ground line 30. Also the line 44 is connected to the anode side of a voltage regulator 47 with lower voltage rating than regulator 46, the other side being connected through a potentiometer 48 to a cathode line 49 designated K, this line being connected to ground line 30 through a resistor 50** bypassed by a capacitor 51. The moving arm of the potentiometer 48 is connected to the cathode of the unidirectional conductor 37. Thus it is seen a voltage regulated system is provided for stabilizing especially the voltages on lines 44 and 49 for maintaining the operating potentials of various electronic tubes sufficiently constant as the D. C. currents change during operation. It is also seen that when the D. C. voltage across capacitor 35 has built up sufficiently to show that it is due to the control signal, it can be limited to a desired value by proper setting of potentiometer 48 so that the time required to establish a given D. C. voltage across capacitor 36 is substantially independent of the strength of the control signal above the threshold value.

The "hot" side of capacitor 36, connected to the junction of resistors 33 and 34, is connected to the grid of a triode 52, the cathode of which is connected to cathode line 49 which is positive with respect to ground. The anode of triode 52 is connected through the winding 53 of a relay 54 to the high voltage line 44. Conditions are such that when there is no signal provided by selector 22, and therefore no D. C. current in resistor 34 or voltage across capacitor 36, then the current through the winding 53 is insufficient to operate the relay 54. This relay has two armatures, 55 and 56, normally held open against back contacts 57 and 58 by springs 59 and 60. When the control signal from selector 22 has exceeded a threshold value for a sufficient and fixed interval of time, the grid voltage of triode 52 rises sufficiently to cause sufficient current to flow to actuate relay 54 and cause its armatures to be pulled in, and to contact front contacts 61 and 62. Manual means for causing the relay to operate for test purposes is provided by a push button switch 63 connected between the grid and cathode of triode 52, which when depressed brings the grid to cathode potential and causes anode current to flow.

Now the relay 54 closes while the control signal is still on and the voltage across capacitor 36 is still building up toward its possible maximum. Therefore the relay 54 cannot be used directly to operate the shutter mechanism, but a delay must be inserted so that the still picture desired to be photographed will be available when the shutter operates. This is provided for by use of the armature 56, and for this purpose it is connected to high voltage line 44. Moreover closure of the relay 54 is required until after the operation of the shutter solenoid, so that means must be provided for holding the relay 53 closed after the control signal has ceased and the capacitor 36 discharges to lower the relay current. This holding however can be terminated after the shutter operation. This is provided by use of the armature 55, and for this purpose it is connected to the anode of triode 52.

Because of the very considerable inductance of the shutter solenoid 14, and the relatively heavy current required for quick operation, a power type electronic pentode tube 64 is provided with its anode connected to one end of the solenoid winding, the other end of which is connected to high voltage line 42. This solenoid winding may be shunted by a resistor 65 to reduce the back voltage when the anode current of pentode 64 ceases. The screen of the pentode 64 is connected to anode supply line through resistor 66, the cathode and suppressor grid are connected to the supply line 42 through resistor 67 and to ground line 30 through resistor 68, and the control grid is connected to ground. The connections are such that the cathode of pentode 64 is normally positively biased with respect to the grounded control grid due to the currents through resistors 67 and 68, so that little or no current passes through the solenoid winding. The pentode is caused to pass current to operate the solenoid by connecting the cathode to ground, and to release the solenoid by the inverse process of ungrounding the cathodes.

A relay 69 is therefore provided with an armature 70 normally held against a back contact 71 by a spring 72. The winding 73 of the relay is connected between the anode of a triode 74 and anode supply line 44, the cathode of the triode being connected to cathode line 49, and the grid being normally at ground potential. This relay is caused to be operated by building up a positive voltage on the control grid of suitable strength, and caused to be released by later grounding of the grid. To delay the operation of relay 69 for a suitable and settable time after the closure of relay 54, the front contact 62 of relay 54 is connected through fixed resistor 75 and variable resistor 76 to ground line 30. The junction of resistors 75 and 76 is connected through a relatively high valued resistor 77 to the grid of triode 74. This grid is connected to one end of a capacitor 78, the other end of which is connected to ground. This grid is also connected to a line 79 which is insulated from all other circuits until after the closure of relay 69 and the operation of the solenoid, and therefore does not enter into the delay action. A resistor 80 may be connected from the back contact 58 of relay 54 to ground line 30.

Normally, as in the position shown, current passes from the line 44 through the armature 56 and resistor 80 to ground. As the voltage on capacitor 36 builds up and relay 54 operates, the current through resistor ceases, to compensate for the increased current drain on the power supply system, thereby tending to maintain voltages constant. When the relay 54 closes, D. C. voltage is impressed on contact 62, so that current flows through resistors 75 and 76, and also through resistor 77 to charge the capacitor 78. When the capacitor 78 has charged sufficiently to bring the grid voltage of triode 74 sufficiently positive, the relay 69 operates. The amount of time required for charging condenser 78 to the required value is controllable and settable by variable resistor 76, which in effect controls the D. C. voltage applied to resistor 77 and capacitor 78 in series. In this manner the relay 54 is caused to operate the relay 69 after a required amount of delay.

For actuating the pentode 64 and therefore the solenoid shutter 14, the cathode of the pentode has been connected to the front contact 81 of relay 69. The armature 70 of this relay is connected to the back contact 82 of an armature 83 of a relay 84, against which the armature is normally held by a spring 85. The armature 83 is grounded to line 30. The relay 84 is not actuated until after the shutter solenoid has been pulled down, so that prior to operation of the solenoid, the contact 82 and therefore armature 70 is connected to ground. Closure of relay 69, delayed after closure of relay 54, therefore grounds the cathode of pentode 64 and causes the pentode and solenoid to operate.

To provide for holding the relay 54 closed after the control signal ceases and plate current of triode 52 starts to fall off, the front contact 61 of relay 54 is connected through a resistor 86 to the back contact 71 of relay 69, by a line 87.

Bearing in mind that relay 84 does not close until after the closure of relay 69, the line 87 is seen to be grounded when the relay 54 closes. Then in addition to the current through the winding 53 due to the anode current of triode 52, there is a holding current also flowing through armature 55, contact 61 and resistor 86. This is sufficient to hold the relay closed after the anode current ceases. When, however, the relay 69 closes, the line 87 becomes ungrounded, the holding current ceases, and the relay is free to fall back to normal.

The timing of the shutter 12 is controlled by circuits between the solenoid and the relay 84, the operation of which is initiated by the operation of the shutter. Thus a contact device 88 is provided so that connection will be made between contacts 89 and 90 when the solenoid plunger is pulled completely in. An insulating member 91 prevents the plunger from coming into electrical contact with contact 89. Between line 44 and line 49 are three resistors 92, 93, 94, the middle one having a variable tap connected to contact 90, so that it has impressed upon it a potential positive with respect to the cathode line. The contact 89 is connected through resistors 95 and 96 to the grid of a triode 97, the cathode of which is connected to the cathode line 49. From the junction of resistor 95 and 96 to ground line 30 is a resistor 98 paralleled by a capacitor 99. The anode of triode 97 is connected to one end of the winding 100 of relay 84, the other end of which is connected to supply line 44. When the solenoid is pulled in to establish connection between contacts 89 and 90, the capacitor 99 starts charging and after an interval of time controlled by the setting of the tap on resistor 93, the grid potential is made sufficient positive so that relay 84 operates. When this occurs, the armature 83 of relay 84 is brought to a forward contact 101 connected by line 79 to the grid of triode 74. This grounds the line 79, quickly discharging the capacitor 78, releasing relay 69, thereby biasing the cathode of pentode 64 positive with respect to the grid, cutting off the current of the solenoid and causing the solenoid to be restored to normal due to the restoring action of spring 15. In this manner the closure of the shutter is timed.

The relay 84 has a second armature 102 normally held against a backstop by a spring 103 which is pulled to a front contact 104 when the relay 84 is actuated. The armature 102 and contact 104 are connected to the terminals 16, 17, respectively leading to the equipment of Fig. 2, thereby connecting these terminals together while relay 84 is closed.

Backlash operation is important in the functioning of these circuits. That is, a relay will not open until the current through it is reduced below the value of the current which was required to pull it in. Now when relay 84 closes, the contacts 89, 90 which brought about this closure are opened, so that the capacitor 99 is no longer under charge through resistor 95 but discharges through resistor 98. The time constant of the discharge is made sufficiently long by making resistor 98 of a very high resistance, so that the relay 84 will not fall out until the terminals 16, 17 have been connected together so that subsequent circuits maintain themselves in operation after the relay 84 finally opens.

It should be noted that not until the final restoration of relay 84 will the line 87 be grounded. It is necessary that the time constant of the circuit 34, 36, associated with the input of triode 53 be such that the relay 54 falls out while line 87 is still ungrounded, due to the closure of one of the two relays 69 and 84. This is readily accomplished, so that the entire system is self resetting to the normal conditions indicated without any relay or solenoid operating more than once.

Figure 2:
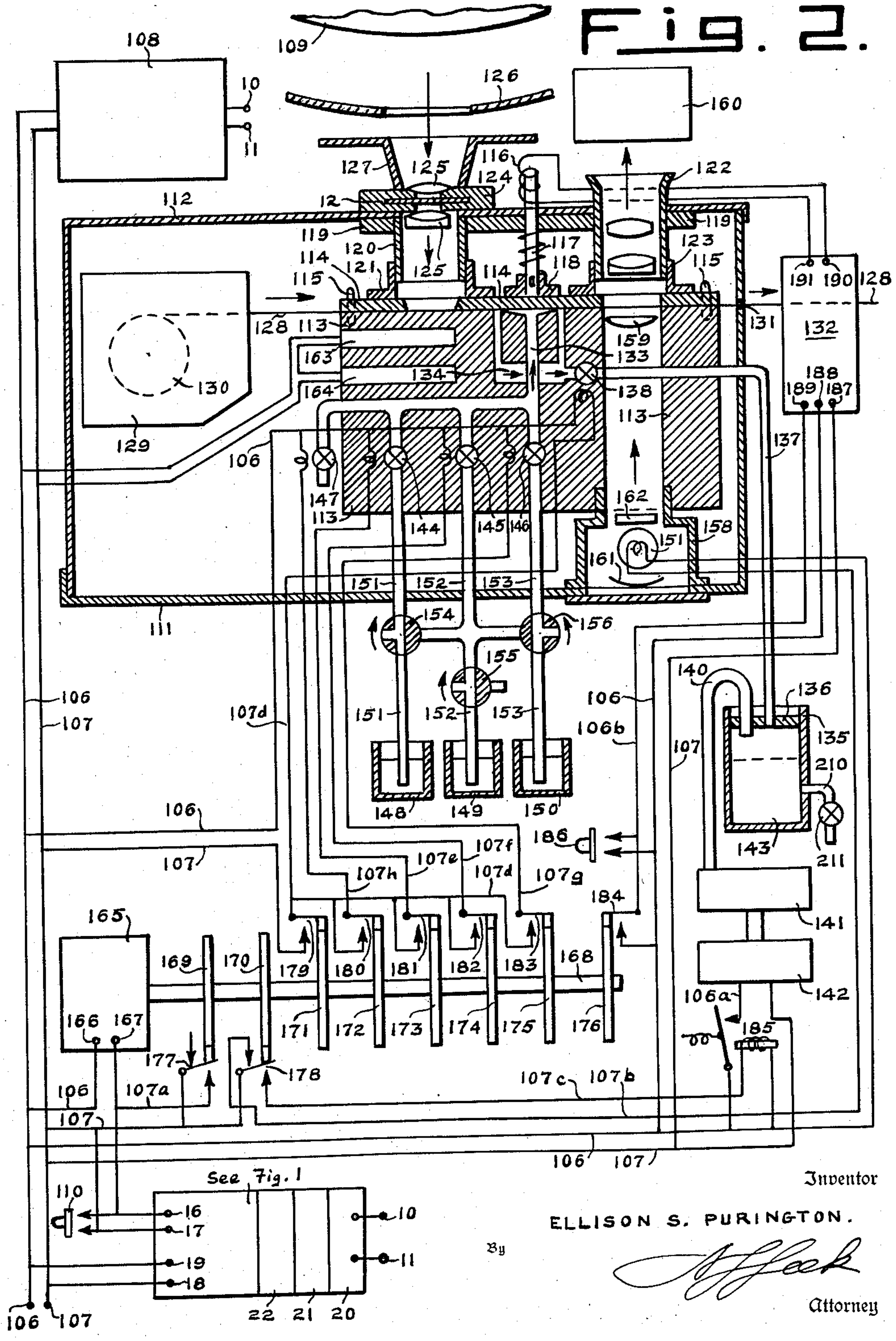
Fig. 2 is a schematic diagram showing electrical, mechanical, optical, and fluid flow devices set into operation from the output devices of Fig. 1, for processing and projecting the latent image recorded by use of circuits of Fig. 1.

Fig. 2 shows schematically the optical and photographic and projecting system, together with electrical circuits, pneumatic circuits, liquid circuits, necessary for operation. These are all powerized from an A. C. line 106, 107 connected to an A. C. power source. This line also supplies the TV receiver 108, with conventional antenna not shown, and with leads not shown to a kinescope with face 109 on which the picture image is formed by conventional methods. From the receiver 108 are brought out two terminals 10, 11 driven from the video amplifier, connected by lines, not shown, to the input of selector 20 of Fig. 1. For convenience, Fig. 1 is duplicated in block with terminal connections. It will be understood that circuit of blocks 20, 21, 22 are powerized from equipment of TV receiver block 108, or otherwise. It will be further understood that when Fig. 2 is under consideration, the control signal has passed, the still picture has been presented on the screen 109 and the shutter opened for the required length of time and the terminals 16, 17 are being shorted for a few seconds within Fig. 1. For convenience, a push button switch 110 may be connected across terminals 16, 17 for operating Fig. 2 independently of the operation of Fig. 1. Thus by depressing button 110 for a few seconds, the cycling is started and the circuits carry it through to process a blank picture, since pushing the button 110 does not operate the shutter.

The camera-processor-projector system is housed in a casing 111, 112, the upper and lower surfaces of which are not shown. Mounted within the casing is the processing head 113 fabricated from stainless steel or other opaque material, noncorrosive by photographic chemicals. On the front face is a cover plate 114 of similar material, movable outwardly upon pins 115 secured into the head 113, with a straight line or linear motion. This may be moved electrically by use of a solenoid winding 116 and plunger 117 seated in a fitting 118 secured to the cover plate, and passing through a bearing plate 119 secured to the casing 112. Manual means not shown may be also used to withdraw the cover plate away from the head. Into the bearing plate 119 is rigidly secured a tube 120 slidably engaging a fitting 121 fastened to the cover plate, and through this fitting and tube passes the light corresponding to the picture being recorded. The outer tube of a projection lens 122 also passes through the bearing plate, arranged for focussing adjustment by a screw thread on the tube engaging a pin, not shown, attached to the bearing plate. This lens tube slidably and rotatably engages a fitting 123 secured to the face plate, and through this fitting and tube passes the light for forming a projected image on a screen. These fittings provide for motion of the cover plate forward or back with a lightproof slidable joint between the tubes and the fittings.

Externally mounted on the casing 112 is the shutter frame 124 in which is mounted the forward and rear parts of the recording lens 125 between which moves the shutter blade 12 with aperture 13, shown in Fig. 1, in accordance with the operation of the shutter solenoid not shown. It will be understood the aperture is in alignment with the axis of the recording lens 125 when the solenoid plunger is completely down. Then light from the kinescope face 109 passes through the spherical mirror 126 of the kinescope projection system of standard construction except for the hole in the mirror, and through a conical light shield 127, and through the lens and aperture.

Between the cover plate and the processing head is a motion picture type film 128 capable of moving to the right out of a magazine 129 where it is stored on a reel 130, and through an aperture 131 in the casing in accordance with the operation of a pull up device 132 shown later. The distance between centers of the tubular fittings 121 and 133 is an even integral number times the distance between sprocket holes of the film. A tapered hole in the cover plate 114 provides for light entering the camera lens 125 being impressed on the film 128. The emulsion of the film is on the inner slide away from the source of light, and the optical elements are preset so that the image of the picture of the kinescope screen is focussed upon the emulsion.

Centrally between the centers of the fittings 121 and 123, is a depression in the processing head and a central hole 133 which marks the processing position. This is the entrance channel for fluids required for processing the latent image, after it has been pulled to the processing position by the advancing mechanism 132. Around the periphery of the depression is a circular slot, all parts of which lead to a common chamber 134, and these form the exit channel for the fluids after use. In practice this structure may be formed by boring a well into the processing head in which a central cylindrical piece is supported by screw threads, with arrangements for passing the input fluids through a duct through the region for exit fluids. A vacuum system is used to drive the fluids through the entrance channel, radially between the depression and the emulsion of the film to be processed, and through the exit chamber. Thus a closed chamber or sump 135 is provided, with a top seal 136 through which passes a tube 137 to a circular hole in the processing head leading through an electrically operated exhaust valve 138 to the exit chamber 134. Also a tube 140 through the seal 136 leads to a vacuum pump 141 driven by a motor 142 to maintain the air in the chamber 135 above the exhausted liquids 143 at a negative pressure with respect to atmospheric pressure. Whenever valve 138 is open, and the air in chamber 135 is at negative pressure, the emulsion side of the film 128 is pulled down toward the depression at the end of the entrance channel 133 to prevent fluids flowing beyond the periphery of the circular exit channel, but allowing them to flow freely from the entrance channel to the exit channel along the emulsion surface. The fluid to be admitted is controlled by electrically operated valves 144 to 147 respectively, normally passing developer, water, fixer, and air respectively from containers 148, 149, 150 and the space within the camera chamber respectively. The liquid fluids are fed through pipes 151, 152, 153. Valves 154, 155, 156, are also in the pipe lines, for use in servicing the equipment in a manner to be described later. Thus a system is provided for developing, washing, fixing, washing, and air drying the circular portion of the film drawn downward into the depression, and changing the latent image to a real image on the film.

After processing, the film is again advanced by pullup 132 to a projecting position in front of the projection lens system 122. For projecting, a lamp source 157 is placed in a casing 158 to provide light through a hole in the processing head 113 which passes through a condenser lens 159 to illuminate the film 128 where the processed film is located. Light passing through the film through a hole in the cover plate 114 and through the projection lens system 122 is reflected by a mirror 160 and illuminates a screen not shown upon which the projected image is focussed by adjustment of the lens 122. The light flux may be increased by use of a concave mirror 161 behind the lamp 157. The chamber around the lamp may be pressurized slightly by a cooling fan to force air through the hole in the processing head to drive away moisture coming from the film due to heat, this being carried away by exhaust channels in the surface of the processing head not shown. Special heat absorbing glass 162 may be placed at the entrance of the hole in the head to reduce the heat rays impinging on the film, without stopping the flow of air. Suitable provisions are made for making the system light tight, so that light from the lamp 157 does not fog the part of the film 128 which is awaiting processing. For this purpose, the runway for the film between the head and cover plate is arranged to minimize light travel from the illuminated film through open spaces between the film and the surfaces of the head and plate. If desired, special glass filters may be used to cut down the photo-active rays from the lamp 157 without serious reduction of the light rays.

The processing head is brought and maintained at an elevated temperature by a thermostat element 163 and heater element 164 placed in holes in the head, and joined in series and to the supply lines 106, 107. This speeds up the chemical action and permits the processing to be completed in less than ten or even five seconds. Additional time is required for the film advancing operation, and other switching operations.

Figures 3, 4:
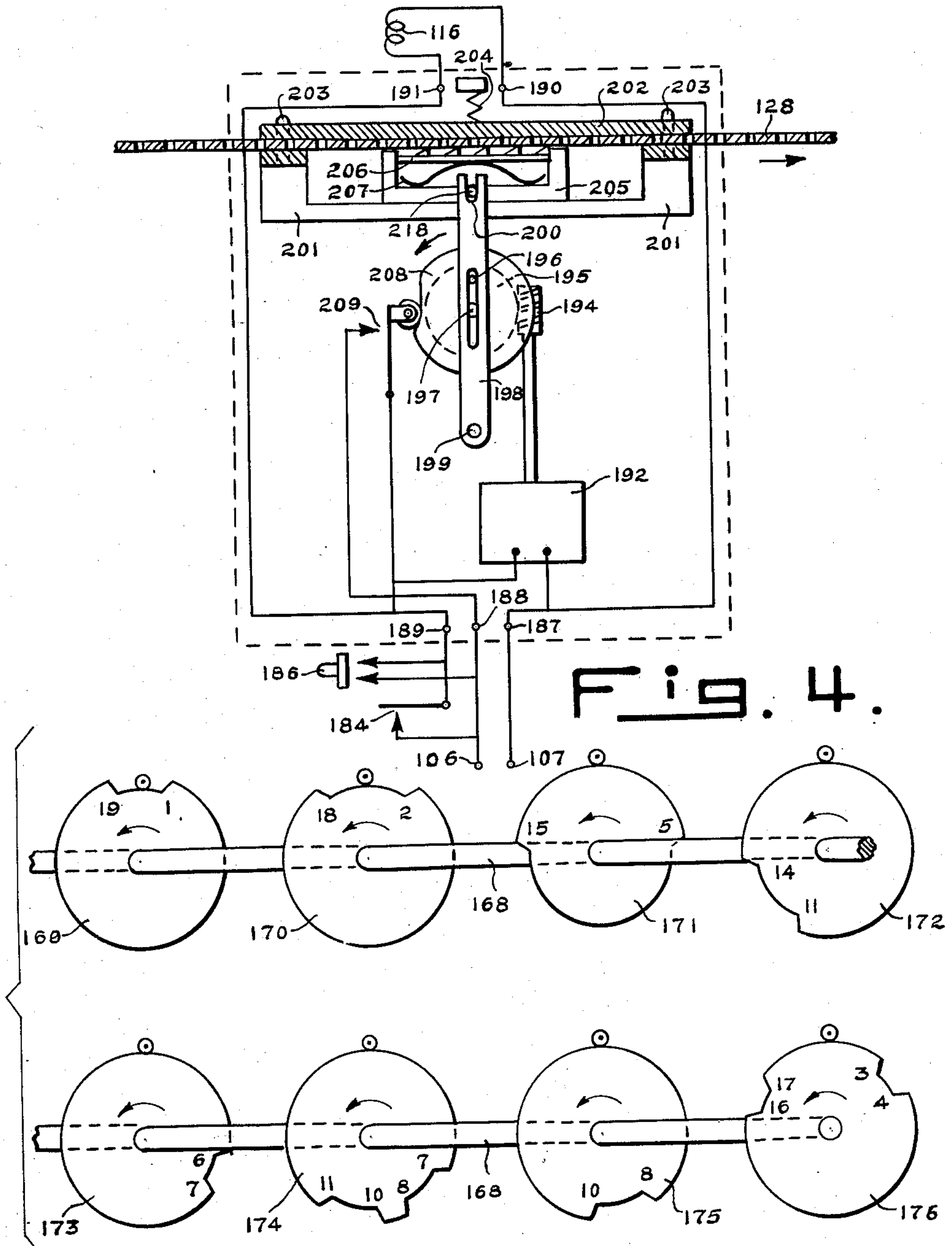
Fig. 3 is a detail view of the timing discs referred to in Fig. 2.
Fig. 4 is a diagrammatic view showing a mechanism for advancing the film referred to in Fig. 2.

For controlling the operations, a timer motor 165 is provided with power terminals 166, 167, which drives a shaft 168 at a suitable slow rate, such as one revolution in twenty seconds. Mounted on and keyed to the shaft are eight timer wheels 169 to 176 respectively, provided with micro switches which operate in accordance with the cuttings of the timer wheels. Fig. 3 shows the position of the cuttings, and their locations relative to the rollers of the micro-switches when the system is at rest. The first switch has the roller normally in the notch at the timer disc and closes a circuit when it rides on the periphery. The second has a roller normally in the notch of the timer disc, and closes one circuit when in the notch, and another circuit when on the periphery. The remainder have rollers normally riding on the peripheries of the discs, and close a circuit when they come down into the notches. The instants of time, for example, at which the switches change positions are noted on the timing discs in Fig. 3.

For the motor operation, line 106 is connected to motor terminal 166; line 107 is connected to the leaf of switch 177, the front contact of which is connected by line 107*a* to terminal 167 of the motor. The terminals 16, 17 of Fig. 1 are connected to lines 107*a* and 107, and the contacts of button switch 110 in parallel with 16, 17 are also across from 107*a* to 107. Voltage is impressed upon the motor automatically by shorting 16 and 17 within Fig. 1, or manually by pushing button 110. The motor then starts and turns the shaft 168 and disc 169. Switch 177 closes after one second and provides a connection from 107 to 107*a* to maintain the motor operative after the internal connection between 16 and 17 is broken. The motor is energized until the count of 19 seconds, when the power is cut off and the system coasts to rest with the roller in the middle of the notch.

The second switch 178 controls lamp 151 and the motor 142 for the vacuum pump 141. The latter uses a relay 185. One side of the lamp and the relay winding are connected to line 106, the other side at the lamp and the other side of the relay are connected to the rear and front contacts of switch 178 by lines 107*b* and 107*c*. The leaf of the switch 178 is connected to line 107. The lamp is normally on, but cuts off at the count of two seconds, and the relay 185 is then actuated. The relay is deenergized at the count of 18 and the lamp cut on to remain on while the motor 165 is at rest. Line 107 is connected to one side of the motor 142, the line 106 is connected to the armature of relay 185, the contact of which is connected through line 106*a* to the other side of motor 142. Therefore the motor 142 is driven only while the relay is closed, from the count of 2 to the count of 18 on disc 170.

While the pump is building up a vacuum in chamber 135, and this vacuum is not yet applied to the chamber 134, the latent image on the film is carried to the processing position by the pull up device 132, under the control of switch 184 for disc 176. As a convenience, the contacts of the switch 184 are bridged by a push button switch 186. The pull up device has five termials, 187 to 191 respectively. Referring especially to Fig. 4, the advancing mechanism is driven by a motor 192, with shaft 193 turning a worm 194 driving a worm gear 195 carrying a pin 196 off center from the bearing 197, said pin passing through a slot in an arm 198 pivoted at one end at 199 and terminated at the other with a fork 200. This arrangement provides moving the forked end of arm 198 back and forth to the left and right. The film 128 is carried between a frame 201 and a cover plate 202 suitably registered with respect to the frame by use of pins 203. The film is held between the cover and frame by a spring 204 with suitable tension, and a suitable track for the film is provided. A frame 205 is slidably mounted on frame 201 in a groove not shown, and this carries a toothed rack 206 pressed against the film by a spring 207. This frame 205 with rack 206 are driven back and forth by a pin 218 engaging the fork 200. The teeth of the rack 206 are so cut that when the rack is moved to the right, they engage the sprocket holes of the film 128 and thus also carry the film 128 to the right. When the rack is carried back to the left, the teeth are so fashioned that they do not actively engage the sprocket holes and the film is not carried back. The tension is such that the film is not carried back by the friction between the teeth and the film between the sprocket holes, but such that the motor can move the film to the right when the teeth engage the holes, without tearing the film. The construction is such that the rack moves back and forth slightly more than the integral number of sprocket holes, corresponding to the pull up distance required. Thus, for example, with the pull up distance five times that between centers of adjacent sprocket holes, then the travel distance is 10 percent greater, corresponding to an extra half hole. In this manner, it is made certain that the rack will engage the film to carry it forward five lengths in spite of irregularities of construction.

A cam disc 208 is provided, fastened to the gear 195, cut away as shown to operate a micro-switch 209, for holding the motor in operation after the starting pulse has been applied by switch 184. Thus line 107 is connected to terminal 187 and one side of the motor 192. Line 106 is connected to one contact of each of switches 184, 186, 209 and terminal 188, the other contacts of which are connected in parallel, to terminal 189 and to the other side of the motor. Thus the motor is powerized when any of the three switches 184, 186, 209 are closed. The motor may be such as to drive the worm gear around a complete revolution in two seconds. First, switch 184 is closed one second from the count of 3 to the count of 4, as shown by the cutting of timer disc 176. This starts the motor and disc 208 moving and the switch 209 then closes to hold the system running after switch 184 opens. The motor stops when the switch 209 opens about one second after switch 184 opens. The cam is so cut, and the motor so turns that the motor comes to rest on the back stroke of the rack. Thus the motor 192 starts under no load, then picks up the rack and moves the film forward under load, then moves back under no load to rest. Preferably the motor 192 is out of a quick stopping type.

Terminals 190 and 191 are connected to terminals 187 and 189 respectively, to which the terminals of the motor are also connected. These terminals 190 and 191 are connected to the solenoid 116, Fig. 2 which moves the cover plate 121 away from the film and processing head. The motion is not so great that the film gets out of the track provided, but is sufficient to permit the film to be moved to the right by the device 132. It should be noted that the solenoid is powerized during the back stroke of the rack, so that the film is free by the time the rack engages the film to move it forward. The solenoid also is released during the back stroke of the rack after the film has been advanced. In this way the film is kept tightly in position except when it is being moved forward.

The pull up device and solenoid release is also actuated by the switch 184 between the counts of 10 and 17, after the processing, for the purpose of moving the processed image to the projection position.

The remaining timer discs 171 to 175 and switches 179 to 183 are for controlling the five electrically operated valves 138, 144, 145, 146, 147. Line 106 is connected to one side of each of the windings of the five solenoids of the valves, and line 107 to the contact of switch 179, the leaf of which is connected to the contacts of all the other switches 180, 181, 187, 183, and the leaf of 179 is also connected by line **107*d* to the other side of the solenoid vacuum valve 146. As seen from the cutting of the disc 171**, the vacuum valve is opened for drawing in the film and for producing a flow of processing fluids from the count of 5 to 15.

Thereupon disc 173 closes developer switch 181 to connect line 107 to line **107*e* and to the other side of the winding of the developer solenoid valve 147, from the count of 6 to 7. Developer is then pushed by the excess pressure on the surface of the developer liquid in container 148 over that in chamber 135, through the entrance line 133, along the film and out into the sump 135**.

Similarly disc 174 then operates to wash the system from the counts of 7 to 8; disc 175 operates to apply fixer from the count of 8 to 10; disc 175 again operates from the counts of 10 to 11 to wash the system; disc 172 then operates to admit air through the system to dry the film from the count of 11 to the count of 14. Air taken, from the camera chamber through valve 147 is replaced by air flowing from the outside of the chamber through a light proof opening not shown. The vacuum valve is then closed to release the film so that it may be advanced at the count of 16 to 17.

As previously explained, the cycle terminates with the film in the projection position with the lamp operative, and the projection continues until a new picture is received, and the shutter operated, whereupon the system again cycles to produce another projected picture.

For testing push button 110 may be operated to cycle the system without opening the shutter, and the processing produces a transparency on the film.The film may be advanced without processing by holding down button 186 to keep the pull up device in operation until the desired part of the film is available for inspection. Push button 63, Fig. 1 may be used to take a picture of material on the screen other than that especially sent for automatic recording. It is to be noted that the special material is sent by a reversed video signal in which bright lines on the kinescope produce dark lines on the developed film and therefore in the projected picture. Further the copy from the special picture is sent for recording may be upside down, so that the received projected image will be right side up with a minimum number of mirrors.

Servicing involves, of course, keeping the containers 148, 149, 150 supplied with proper liquids, and keeping the level of the exhaust liquids in container 135 sufficiently low, the latter being facilitated by use of a drain pipe 210 with valve 211. Also it is desirable to clean out the interior of the fluid system from time to time. For this purpose, valves 154 and 156 are turned to the right and left respectively a quarter of a turn, so that water will be drawn from container 149 through all three lines 151, 152, 153 and valves 144, 145, 146. Cycling the system two or three times by use of button 110 clears the system of developer and fixer. Then the valve 155 is turned a quarter of a turn to the right, to admit air into the lines, and the system then cycled to clear the chambers of water. These valves are then reset back to the normal position indicated.

It will be understood that special automatic provisions can be used for assisting in the servicing of the equipment.

It will be further understood that the system is shown only in a schematic manner. Thus in practice the channels from the valves to the entrance line 133 may occupy much smaller volume, and may be disposed in a better manner not readily depictable in the present drawing.

What is claimed is:

1. In a television receiver having a video channel carrying received video signals representing a video program with a control signal and a still picture signal interposed in the program in timed sequence, and having camera means including a shutter disposed to record photographically the still pictures when it appears on the television screen and processing means operating in a timed cycle to process the photographed picture, a timing relay, a circuit tuned to respond to said control signal, a circuit comprising a resistor and a capacitor in communication with said tuned circuit, means to connect said last-named circuit to actuate said timing relay, means including a second relay whereby said timing relay is connected to actuate said shutter a predetermined time after the actuation of said timing relay, a timing circuit energized by the actuation of said shutter, a third relay having means to cause release of said second relay to restore said shutter after a predetermined time, a circuit for initiating the operation of said processing means actuated by said last timing circuit, and means to connect said last-named circuit to said processing means.

2. In a television receiver according to claim 1, adjustable timing means in said tuned circuit, said timing relay, and said timing circuit for adjusting the timing thereof.

3. In a television receiver according to claim 1 in which said central signal comprises a high frequency wave modulated by a lower frequency, said tuned circuit including a circuit tuned to said high frequency wave, a demodulator connected to detect said lower frequency and a circuit tuned to said lower frequency and a voltage limiting device in said last circuit whereby the detected signal is independent of variations in input amplitude above a fixed minimum.

References Cited in the file of this patent

UNITED STATES PATENTS

| | | |
|---|---|---|
| 2,604,535 | Garman et al. | July 22, 1935 |
| 2,446,668 | Tuttle et al. | Aug. 10, 1948 |
| 2,477,848 | Borek et al. | Aug. 2, 1949 |
| 2,540,124 | Klein | Feb. 6, 1951 |
| 2,547,828 | Maussnest | Apr. 3, 1951 |
| 2,550,680 | Ewing et al. | May 1, 1951 |
| 2,613,264 | Haynes | Oct. 7, 1952 |
| 2,704,784 | Hammond | Mar. 22, 1955 |